(12) United States Patent
Boquet et al.

(10) Patent No.: US 11,904,731 B2
(45) Date of Patent: Feb. 20, 2024

(54) CONTROL DEVICE FOR VEHICLE SEAT (71) Applicant: FAURECIA Sièges d'Automobile, Nanterre (FR)

(72) Inventors: Mathieu Boquet, Verrieres le Buisson (FR); Emmanuelle Brunet, Arpajon (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 552 days.

(21) Appl. No.: 17/136,790

(22) Filed: Dec. 29, 2020

(65) Prior Publication Data

US 2021/0206294 A1    Jul. 8, 2021

(30) Foreign Application Priority Data

Jan. 3, 2020    (FR) ...................................... 2000039

(51) Int. Cl.
*B60N 2/02*    (2006.01)
*B60N 2/75*    (2018.01)
*B60N 2/22*    (2006.01)

(52) U.S. Cl.
CPC ......... *B60N 2/0228* (2013.01); *B60N 2/2209* (2013.01); *B60N 2/773* (2018.02); *B60N 2/797* (2018.02); *B60N 2002/0212* (2013.01)

(58) Field of Classification Search
CPC ...... B60N 2/0228; B60N 2/797; B60N 2/773; B60N 2/2209; B60N 2002/0212; B60N 2/02; B60N 2/75; B60N 2/22
See application file for complete search history.

(56) References Cited

U.S. PATENT DOCUMENTS

| 5,038,086 A | * | 8/1991 | Ahmed | ..................... H02P 5/68 |
| | | | | 318/264 |
| 5,245,142 A | | 9/1993 | Sacco | |
| 2014/0210239 A1 | | 7/2014 | Yetukuri | |
| 2017/0308239 A1 | | 10/2017 | Higashihara | |
| 2018/0304789 A1 | | 10/2018 | Robert | |

FOREIGN PATENT DOCUMENTS

| EP | 0084107 A1 | 7/1983 |
| FR | 2649940 A1 | 1/1991 |
| GB | 2235752 A | 3/1991 |
| KR | 19980049645 U | 10/1998 |

OTHER PUBLICATIONS

French Preliminary Search Report for French App. No. 2000039 dated Oct. 16, 2020, BET200372 FR, 9 pages, No English Translation Available.

* cited by examiner

*Primary Examiner* — Robert L Deberadinis
(74) *Attorney, Agent, or Firm* — Barnes & Thornburg LLP (57) ABSTRACT

A control device for automotive vehicle seat, intended to control a displacement along the longitudinal direction, of at least one part of the automotive vehicle seat, comprises at least one first control surface, substantially flat, wherein the first control surface extends along a transverse direction of the seat and a command direction, wherein the command direction has at least one component along the longitudinal direction, and wherein the first control surface is configured for controlling the displacement of the part of the vehicle seat along the longitudinal direction as a function of a movement along the command direction of a member of an occupant of the seat in contact with a first zone of the first control surface.

19 Claims, 7 Drawing Sheets

CONTROL DEVICE FOR VEHICLE SEAT

PRIORITY CLAIM

This application claims priority to French Patent Application No. FR2000039, filed Jan. 3, 2020, which is expressly incorporated by reference herein.

BACKGROUND

The present disclosure relates to a control device for an automotive vehicle seat.

SUMMARY

According to the present disclosure, an automotive vehicle seat control device is intended to control a displacement along the longitudinal direction, of at least one part of the automotive vehicle seat.

In illustrative embodiments, the control device comprises at least one first control surface, substantially flat, wherein the first control surface extends along a transverse direction of the seat and a command direction, wherein the command direction has at least one component along the longitudinal direction, and wherein the first control surface is configured for controlling the displacement of the part of the vehicle seat along the longitudinal direction as a function of a movement along the command direction of a member of an occupant of the seat in contact with a first zone of the first control surface.

Thus, the displacement of the at least one part of the seat along the longitudinal direction is controlled by a movement of a member of the occupant along a control direction, wherein the control direction has a component along said longitudinal direction. This configuration is therefore intuitive for the user.

In illustrative embodiments, the control device comprises one or more of the following characteristics, taken alone or in combination:

the control direction consists of a component along the longitudinal direction and, optionally, a component along the vertical direction, wherein the control direction is preferably intended to extend in a substantially horizontal plane, when the control device is fixed to the seat;

the displacement along the longitudinal direction of the part of the seat comprises:

a longitudinal movement, in particular a longitudinal translation and/or a circular translation, of the seat in the vehicle; and/or a longitudinal movement, in particular a longitudinal translation and/or a circular translation, of a seat cushion of the seat relative to a vehicle chassis; and/or a longitudinal movement, in particular a longitudinal translation and/or a circular translation and/or a rotation around a first transverse axis, of at least one armrest of the seat relative to the seat cushion or to a seat back of the seat; and/or a longitudinal movement, in particular a longitudinal translation and/or a circular translation, of a first part of the armrest relative to a second part of the armrest; and/or a longitudinal movement, in particular a longitudinal translation and/or a circular translation and/or a rotation around a second transverse axis, of at least one elbow support device of the seat; and/or a longitudinal movement, in particular a longitudinal translation and/or a circular translation and/or a rotation around a third transverse axis, of at least one hand support device of the seat; and/or a longitudinal movement, in particular a longitudinal translation and/or a circular translation and/or a rotation around a fourth transverse axis of a headrest of the seat; and/or a longitudinal movement of the seatback of the seat relative to the seat cushion, in particular, a rotation of the seatback of the seat relative to the seat cushion of the seat, around a fifth transverse axis of rotation;

the control device further comprises a switching area configured for switching a function controlled by the first control surface, in particular by the first zone of the first control surface, between a plurality of functions of the seat and/or of the vehicle, wherein the switching zone is preferably included in the first control surface;

the first control surface is further configured for controlling a comfort function of the vehicle seat, in particular an adjustment of at least one among a ventilation means, a heating means, a cooling means and a massage means, and/or for controlling a comfort function of the vehicle, in particular an adjustment of at least one among an audio device, a geolocation device and a ventilation, air conditioning and/or heating device for a passenger compartment of the vehicle;

the first control surface comprises a display area, in particular a touchscreen;

the first zone of the first control surface comprises a tactile area;

the first zone of the first control surface comprises a joystick and/or at least one button movable along the control direction, wherein the at least one button is preferably chosen from:

a button sliding along the control direction (C); and/or a virtual button displayed by the touchscreen of the display area and movable by contact and/or movement of the member of the occupant of the seat with the tactile area;

the control device comprises a second control surface, wherein the second control surface is preferably curved, and wherein the second control surface is configured for controlling a movement along a substantially vertical direction or around a substantially vertical direction, respectively, of at least one part of the vehicle seat, preferably depending on a movement respectively along or around the substantially vertical direction of at least one member of the occupant of the seat in contact with the second control surface;

the second control surface comprises a tactile area and/or a button mobile along the substantially vertical direction;

the first control surface and the second control surface are distant, wherein preferably the first control surface and the second control surface are separated by a distance included between 10 mm and 80 mm along the substantially vertical direction;

the first control surface comprises a means of human-machine interaction configured for commanding adopting a position suited for taking back a steering wheel of the vehicle by a driver;

the control device comprises an electronic control unit configured for translating a signal captured by the first control surface into an instruction for at least one actuator configured for controlling the movement of the at least one part of the seat.

In illustrative embodiments, a hand support device for automotive vehicle seat is described comprising a support surface suited for receiving a palm of a hand of an occupant of the seat, and at least one control device such as described above in all combinations thereof, wherein the control device is configured for being accessible by at least one finger of the occupant of the seat when the palm of the occupant of the seat is in contact with the support surface.

In illustrative embodiments, the hand support device comprises one or more of the following characteristics, taken alone or in combination:

the second control surface of the control device comprises a first zone accessible to a thumb of the occupant of the seat when a hand of the occupant is placed on the support surface of the hand support of the armrest;

the tactile area and/or the movable button of the control device are laid out around an anterior edge of the support surface.

In illustrative embodiments, an armrest for automotive vehicle seat is described comprising a command device such as described above in all combinations thereof.

In illustrative embodiments, an armrest for automotive vehicle seat is described comprising an elbow support device and a hand support device such as described above in all combinations thereof.

In illustrative embodiments, an automotive vehicle seat is described comprising a seat back, a seat cushion and an armrest such as described above in all combinations thereof, fixed to the seat cushion and/or the seatback, wherein the armrest is preferably mounted on the seatback or on the cushion of the seat, pivoting around a transverse axis so as to modify an orientation of the first control surface, and wherein the first control surface extends preferably along a fixed transverse direction and along a control direction variable by rotation around the transverse axis.

In illustrative embodiments, a hand support device for automotive vehicle seat is described comprising a support surface suited for receiving a palm of a hand of an occupant of the seat, and a control device with a first control surface of which a first zone is configured for controlling at least one comfort and/or safety function of the seat, wherein the control device is configured such that the first zone is accessible by a finger of the occupant of the seat when the palm of the occupant of the seat is in contact with the support surface.

Thus, the control surface is accessible by the occupant of the seat, whatever the configuration of the seat.

The hand support device comprises one or more of the following characteristics, taken alone or in combination:

the at least one first control surface extends along a plane;

the plane is intended to be substantially horizontal when the hand support device is fixed to the seat of the vehicle;

the plane extends along a transverse, horizontal direction and along a control direction, having a longitudinal component;

the at least one comfort and/or safety function comprises a movement of the seat or a part of the seat along a longitudinal direction, wherein the first control surface is configured for controlling the movement of the seat or the part of the seat along the longitudinal direction, depending on a movement along the control direction of a finger of an occupant of the seat, in contact with the first control surface;

the movement of a part of the seat along the longitudinal direction comprises:

a longitudinal movement, in particular a longitudinal translation and/or a circular translation, of the seat in the vehicle;

a longitudinal movement, in particular a longitudinal translation and/or a circular translation, of a seat cushion of the seat relative to a vehicle chassis;

a longitudinal movement, in particular a longitudinal translation and/or a circular translation and/or a rotation around a first transverse axis, of at least one armrest of the seat relative to the seat cushion or to a seat back of the seat;

a longitudinal movement, in particular a longitudinal translation and/or a circular translation, of a first part of the armrest relative to a second part of the armrest;

a longitudinal movement, in particular a longitudinal translation and/or a circular translation and/or a rotation around a second transverse axis, of at least one elbow support device of the seat;

a longitudinal movement, in particular a longitudinal translation and/or a circular translation and/or a rotation around a third transverse axis, of at least one hand support device of the seat;

a longitudinal movement, in particular a longitudinal translation and/or a circular translation and/or a rotation around a fourth transverse axis of a headrest of the seat; and/or a longitudinal movement of the seatback of the seat relative to the seat cushion, in particular, a rotation of the seatback of the seat relative to the seat cushion of the seat, around the fifth transverse axis of rotation;

the at least one comfort and/or safety function further comprises a movement of the seat along a first transverse direction and/or a pivoting of the seat around a vertical axis of rotation, wherein the first control surface is preferably configured for controlling the movement of the seat along the first transverse direction and/or pivoting the seat around the vertical axis of rotation, depending on of movement along a second transverse direction of a finger of an occupant of the seat, in contact with the first zone of the first control surface;

the at least one comfort and/or safety functions comprise at least one from:

an adjustment of a ventilation device for the seat;
an adjustment of a heating device for the seat;
an adjustment of a cooling device for the seat;
an adjustment of a massaging device for the seat;
an adjustment of the sound volume of a car radio device, an audio device and/or a high-fidelity device for the vehicle;
an adjustment of a channel broadcast by the car radio device, the audio device and/or the high-fidelity device for the vehicle;
an adjustment of a command of a geo-localization device installed in the vehicle;
an adjustment of a command of an onboard phone in the vehicle or a phone paired with an onboard computer of the vehicle;
an adjustment of a command for a ventilation, air conditioning and/or heating equipment for a passenger compartment of the vehicle;
an adjustment of the longitudinal position of the headrest of the seat;
a command for adapting a position of the seat suited for taking back the steering wheel by a driver;

the first zone of the at least one first control surface comprises at least one tactile region and/or at least one button and/or at least one joystick;

The at least one button is chosen from:
a clickable or depressible button;
a knurled knob configured for being turned around an axis of rotation included in the plane along which the control zone extends;
a trigger;
a fishhook; and/or
a virtual button of the first control surface configured for capturing the contact and/or movement of one or more fingers of the occupant of the seat;

the hand support device further comprises at least one display area associated with the first zone of the at least one first control surface, wherein the display area is preferably included in the first control surface; and the hand support device further comprises a second control surface intended to extend along a substantially vertical plane when the hand support device is fixed to the vehicle seat, wherein the second command surface is configured for controlling a movement of the seat and/or a part of the seat along a first vertical direction depending on a movement along a second vertical direction of a finger of an occupant of the seat, in contact with the second control surface.

In illustrative embodiments, a hand support device assembly is described comprising an electronic control unit and a hand support device such as described above in all combinations thereof, in which the electronic control unit is configured for translating a signal received by the first control surface into an instruction for at least one actuator configured for activating the at least one comfort and/or safety function.

In illustrative embodiments, an armrest for automotive vehicle seat comprising an elbow support device and a hand support device such as described above in all combinations thereof, in particular in the hand support device assembly such as described above is described in all combinations thereof.

In illustrative embodiments, an automotive vehicle seat comprising a seat back, a seat cushion and a hand support device such as described above, in all combinations thereof, in particular in the armrest such as described above in all combinations thereof is further described in which the hand support is fixed to the seat cushion and/or the seatback.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar items.

In the description which follows, the indications for spatial positioning such as top, bottom, upper, lower, horizontal, vertical, etc. are given for clarity of the exposition, according to the usual position of use of the seat, but are not limiting. More specifically, the orientations relative to the front and rear of the seat are relative to the usual position of use of the seat.

The longitudinal direction X extends from the longitudinal direction of the seat. The longitudinal direction of the seat is considered to be the same as the longitudinal direction of the vehicle in which the seat is mounted. This longitudinal direction X corresponds to the normal direction of forward motion of the vehicle. The longitudinal direction is substantially horizontal, preferably horizontal.

The transverse direction Y is the transverse direction of the seat. The transverse direction of the seat corresponds to the transverse or lateral direction of the automotive vehicle. This transverse direction Y therefore corresponds to a direction perpendicular to the normal direction of forward motion of the vehicle. The transverse direction Y is substantially horizontal, preferably horizontal.

Finally the vertical direction Z is a vertical direction of the seat, perpendicular to the longitudinal X and transverse Y directions.

Figure 1:
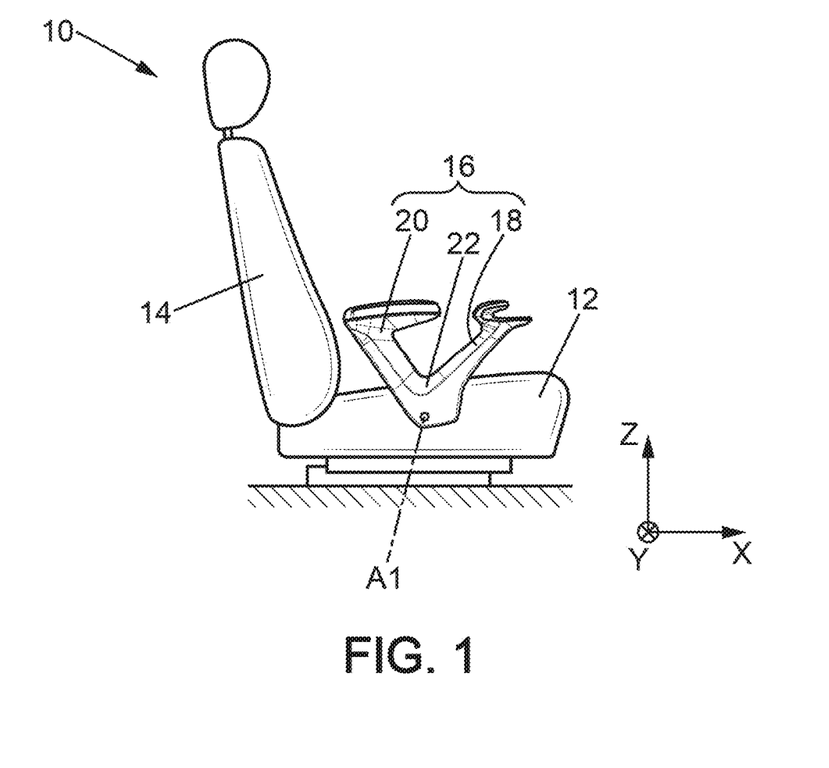
FIG. 1 shows a schematic side view of a seat for automotive vehicle.

A vehicle seat 10 such as shown in FIG. 1, comprises a seat cushion 12 a seatback 14 and at least one armrest 16. Preferably, the armrest 16 is connected to the seat cushion 12. Alternatively, or in addition, the armrest 16 is connected to the seatback 14.

Here, the armrest 16 is mounted pivoting relative to the seat cushion 12 around a transverse axis A1. The seat cushion 16 can thus be inclined relative to the longitudinal direction X of the seat 10. The transverse axis A1 is advantageously substantially horizontal. In FIG. 1, the armrest is located in a non-pivoted position, called standard position. In this standard position, the transverse axis A1 is included here in a horizontal plane P defined by the two longitudinal X and transverse Y directions.

The armrest 16 may have a "V" or "U," shape, with at least two branches 18, 20. Here, the armrest 16 has a front branch 18 and a rear branch 20, connected to each other by a central part 22. Each branch 18, 20 has an upper longitudinal end E18, E20. The upper longitudinal ends E18, E20 of each of the branches 18, 20 are positioned above the central part 22 of the armrest 16, along the vertical direction Z. The central part 22 connects the two branches 18, 20 near the lower longitudinal ends thereof.

The longitudinal end E20 of the rear branch 20 forms or receives an elbow support device S20. The longitudinal end E18 of the front branch 18 forms or receives a hand support device S18. Advantageously, the elbow support device S20 and the hand support device S18 are substantially aligned along the longitudinal direction X, when the armrest 16 is fixed onto the seat cushion 12.

The elbow support device S20 is suited for receiving an elbow and/or a forearm of an occupant of the seat 10. The hand support device S18 is suited for receiving a hand, at least partially, of an occupant of the seat 10.

The hand support device S18 may comprise a support surface M18 that is substantially flat and extends along a plane P18. In the standard position of the armrest 16, the plane P18 is substantially horizontal.

The elbow support device S20 may comprise a support surface C20 that is substantially flat and extends along a plane P20. In the standard position of the armrest 16, the plane P20 is substantially horizontal.

The planes P18 and P20 pivot secured with the armrest 16 around the transverse axis A1. The plane P18 is positioned at a distance D18 from the transverse axis A1. The plane P20 is positioned at a distance D20 from the transverse axis A1.

The distances D18 and D20 are measured along directions normal to the plane P18 and P20, respectively.

The distances D18 and D20 are preferably different, in order to improve the ergonomics of the armrest 16. Here, the distance D18 is less than the distance D20. For example, the difference between the distance D18 and the distance D20 can be included between 10 mm and 20 mm. In that way, the hand support device S18 is positioned in a lower position relative to the elbow support device S20, along the vertical direction Z, when the armrest 16 is located in the standard position. The armrest 16 thus has a better comfort for the occupant of the seat.

The armrest 16 may comprise a free space 24 between the two branches 18, 20 and above the central part 22. This serves to reduce the weight of the armrest 16 and therefore of the vehicle seat 10.

Alternatively, other shapes of the armrest 16 are conceivable, like for example with two branches 18, 20 substantially forming an "X", with the central part 22 then connecting the branches 18, 20 near an intermediate part thereof, between the two longitudinal ends of each branch 18, 20.

As shown, the armrest 16 has a free space 26 between the hand support device S18 and the elbow support device S20. This space 26 between the hand support device S18 and the elbow support device S20 may extend the free space 24 between the two branches 18, 20. The occupant of the seat 10 is provided a satisfactory hold and comfort, even if only a portion of their arm is received on the support devices S18 and S20.

Advantageously, a locking system is included in the armrest 16 in order to block the pivoting of the armrest 16 around the transverse axis A1. The locking system can advantageously be configured for blocking the armrest in a variety of discrete or continuous locking positions corresponding to various inclinations of the armrest 16. In that way the locking system makes it possible to keep an inclination of the armrest 16 relative to the horizontal, longitudinal direction X of the seat 10.

Figure 4:
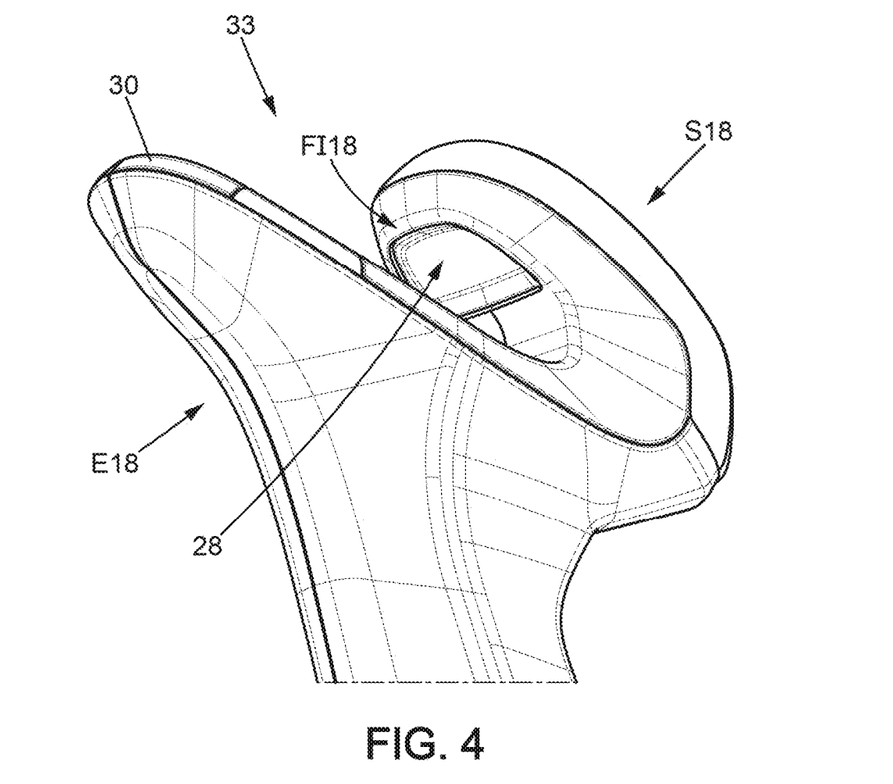
FIG. 4 shows a perspective view of a detail of a hand support device for the armrest from FIG. 2.

An unlocking means 28, visible on FIG. 4, is provided on a lower side FI18 of the hand support device S18. The unlocking means 28 serves to control an unlocking of the locking system, thus allowing a change in the angle of inclination of the armrest 16 relative to the longitudinal direction X, horizontal, by pivoting of the armrest 16 around the transverse axis A1.

Thus, the joint action of the locking system and the unlocking means 28 enable the occupant of the seat to adjust the inclination of the armrest 16 as a function of their preferences and/or of a position of the seat 10, in particular as a function of an inclination of the seatback 14 relative to the seat cushion 12.

Advantageously, the unlocking means 28 is actuated manually by the occupant of the seat 10. Preferably, the unlocking means 28 is positioned such that it can be easily accessible for at least one finger of the occupant of the seat 10 when the palm of the hand is positioned on the support surface M18.

By positioning the unlocking means 28 on the lower side FI18 of the hand support device S18, the positioning of the hand of the occupant, and in particular of the palm of the hand, is not bothered.

This also serves to reduce the risks of unintended actuation of the locking means 28 by the occupant, because such a position of the unlocking means 28 uses an intentional movement of the occupant in order to be actuated.

Here, the unlocking means 28 is a first button 28 depressible along the vertical direction Z, when the armrest 16 is in the standard position. The locking system is unlocked when the occupant of the seat exerts a force on the first button 28, wherein this force is perpendicular to the surface of the first button 28. Advantageously, the locking system is automatically locked when the force exerted by the occupant on the unlocking means 28 stops.

Further, the hand support device S18 comprises a lower surface 30 extending along a plane P30. The plane P30 pivots secured with the armrest 16 around the transverse axis A1. The plane P30 is defined by a direction C, called control direction, and the transverse direction Y. The control direction C may form a nonzero angle with the longitudinal direction X in a plane (X, Z).

The control direction C, included in the plane P30, forms for example an angle included between −10° and +10° with the longitudinal direction X, included in the plane P. The angle between the control direction C and the longitudinal direction X is measured in the plane (X, Z), meaning in the plane of FIG. 3. The plane P30 may therefore be inclined relative to the horizontal. Alternatively, the plane P30 may be substantially horizontal, parallel to the plane P. The plane P30 may have one of the two configurations stated above, depending on the rotation of the armrest 16, around the transverse axis A1.

Figure 3:
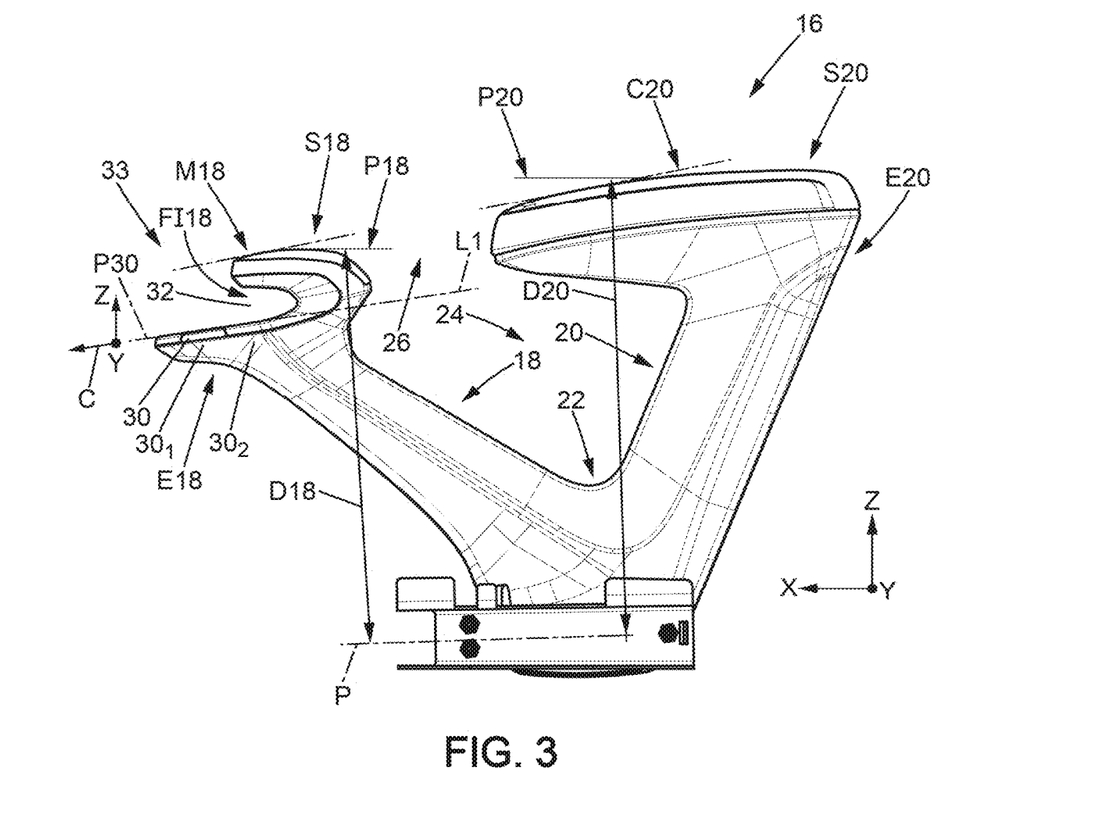
FIG. 3 shows a schematic side view of the armrest from FIG. 2.

The lower surface 30 is located, along the vertical direction Z, beneath the support surface M18, in the standard position of the armrest 16, fixed to the seat 10. An interspace 32, free, separates the lower surface 30 from the lower side FI18.

The lower surface 30 comprises an anterior portion $30_1$ and a posterior portion $30_2$. The anterior portion $30_1$ is placed longitudinally in front of the posterior portion $30_2$, when the armrest 16 is in the standard position thereof, fixed to the seat 10. The anterior portion $30_1$ is directly accessible to the fingers of the hand of the occupant, received near the hand support S18. The posterior portion $30_2$ is disposed vertically beneath the support surface M18.

Here, the hand support device S18 is provided with a control device 33, intended to control a plurality of functions of the seat 10 and/or the vehicle. In particular the control device 33 can serve to control comfort and safety functions of the seat 10 and/or the vehicle.

Figure 2:
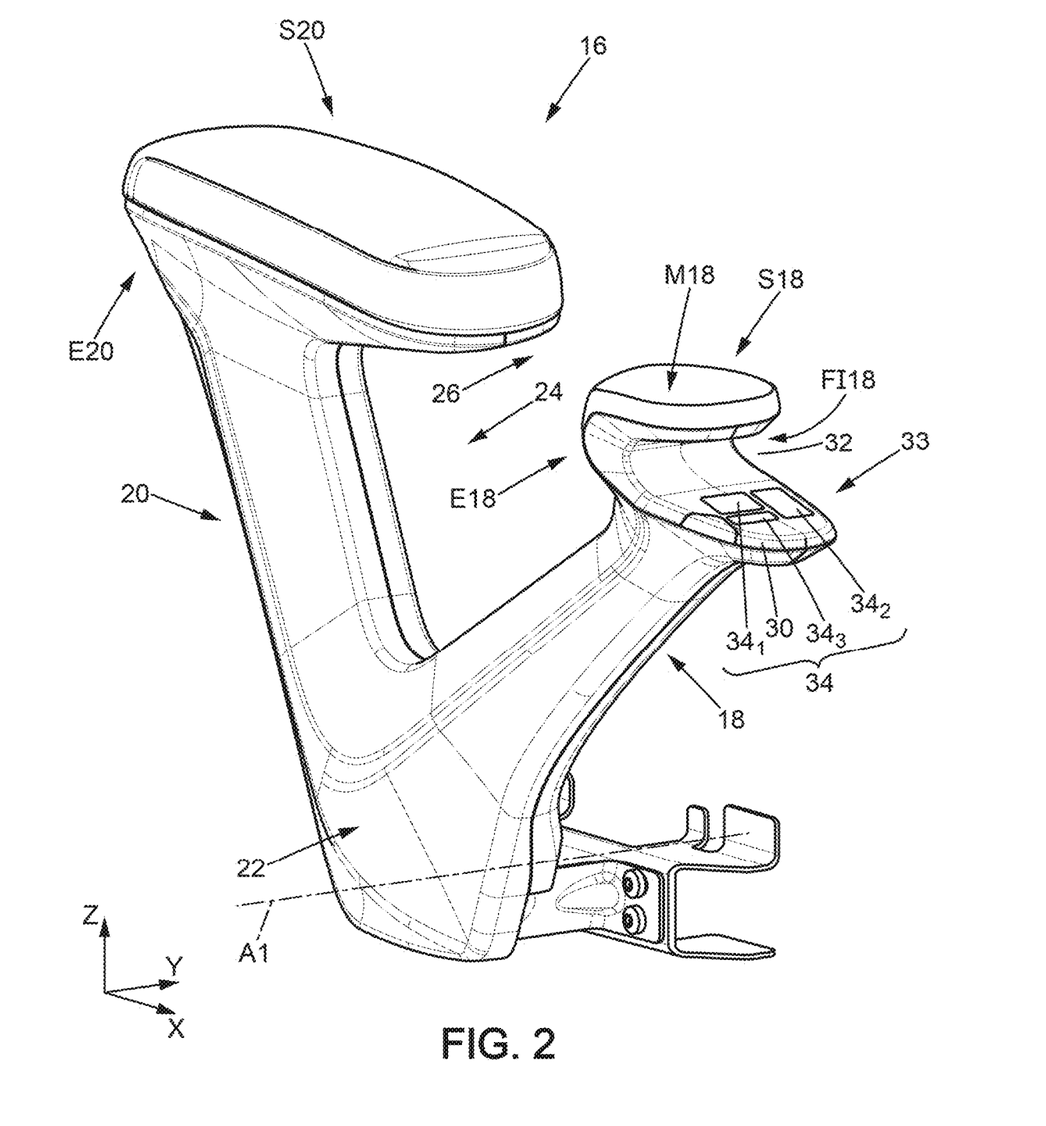
FIG. 2 shows a perspective view of the armrest for the seat from FIG. 1.
Figure 5:
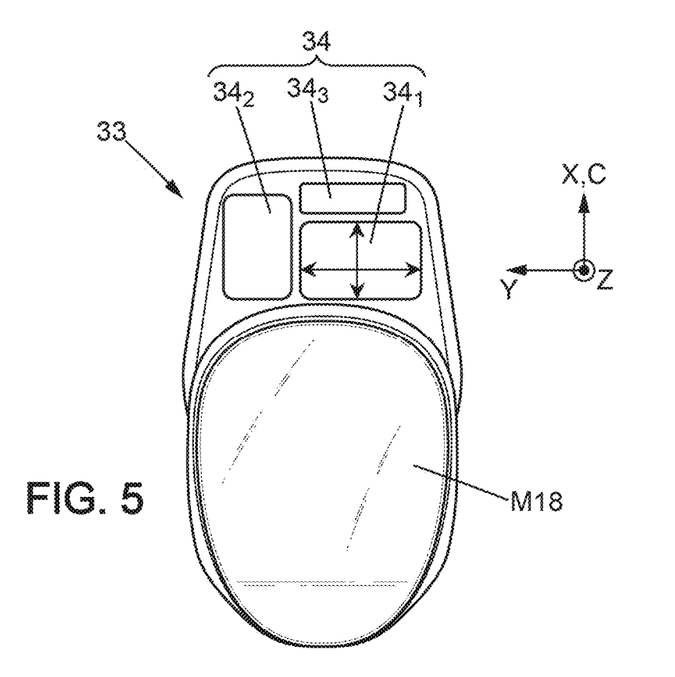
FIG. 5 shows a top schematic view of the hand support device of the armrest from FIG. 2, according to a first configuration.

A first configuration of the control device 33 is shown in FIGS. 2 and 5. According to this first example, the control device 33 comprises a first control surface 34. The first control surface 34 is provided near the anterior portion 301 of the lower surface 30 of the hand support device S18. Thus, the first control surface 34 is easily accessible by at least one member of the occupant of the seat 10, when the palm of the occupant is in contact with the support surface M18. The member the occupant is, for example, a finger.

Here, the control surface 34 extends in the plane P30. In other words, the control surface 34 extends along the control direction C in the transverse direction Y.

As shown in FIG. 5, the first control surface 34 comprises a first zone $34_1$. The first zone $34_1$ comprises for example a tactile area and/or a movable button, in particular in the control direction C and/or in the transverse direction Y. The movable button can in particular have the shape of a button sliding along the control direction C.

Alternatively, the slidable button can in particular take one of the following shapes:

a knurled knob, rotating around a transverse axis substantially parallel to the transverse direction Y and perpendicular to the control direction C; and/or a trigger, rotating around a substantially vertical axis perpendicular to the control direction C and to the transverse direction Y; and/or a fishhook type button, rotating around a substantially vertical axis perpendicular to the control direction C and to the transverse direction Y; and/or a joystick, rotating around a substantially vertical axis perpendicular to the control direction C and to the transverse direction Y; and/or a virtual button displayed on a touchscreen of the first zone $34_1$ and movable by contact and/or movement of the finger of the occupant of the seat on the first zone $34_1$.

The display area $34_2$ can be independent of the first zone $34_1$. Nevertheless, when the screen making up the display area $34_2$ is tactile, the display area $34_2$ may be part of the tactile area of the first zone $34_1$ or even form the entirety of the first control surface 34.

The control device may further comprise an electronic control unit (not shown), for translating the action of the occupant of the seat on the first control surface 34 into an instruction for at least one actuator in the seat or even, more generally, in the vehicle. The actuator comprises, for example, a motor capable of changing a position of the seat 10 or an element of the seat 10.

The electronic control unit the electronic control unit may be arranged near the armrest 16 or under the seat 10. However, any other position inside the vehicle is conceivable.

The first control surface 34 is configured for controlling at least one comfort and/or safety feature of the seat 10 and/or of the vehicle, via the electronic control unit, as applicable.

Actually, the first control surface 34 is configured for receiving a signal created, for example, by the movement of a finger in contact with the first zone $34_1$ of the control surface 34. The movement of the finger may in particular comprise the sliding of the finger on the first zone $34_1$ when the first zone $34_1$ comprises a tactile area.

When the first zone $34_1$ comprises a movable button, the movement of the finger comprises a movement of the finger for exerting a movement force on the button. In this case, the force exerted by the finger has a component tangential to the first control surface 34, allowing displacing the button along a direction included in the plane P30. In particular, the tangential component of the force has a direction parallel to the control direction C, when the button is displaceable along the control direction C.

The signal received by the first control surface 34 may next be translated by the electronic control unit into an instruction for the at least one actuator configured for controlling one or more comfort and/or safety functions.

Particularly advantageously, a movement of a member, in particular a finger, of the occupant of the seat in contact with the first zone $34_1$ of the first control surface 34, in a plane (C, Y), controls the movement of the at least one part of the vehicle seat along the longitudinal direction X. In that way, the use of the control device is particularly intuitive, because the movement of a part of the seat is controlled in a longitudinal direction X, as a function of a movement of the member of the occupant of the seat, in the control direction C, wherein the control direction C comprises at least one component along the longitudinal direction X. It can be noted here that the control direction C could possibly be identical to the longitudinal direction X, depending on the pivoting of the armrest 16 around the transverse axis A1.

The control device 33 may in that way control in particular a movement of the seat 10 and/or a part of the seat inside the vehicle along the longitudinal direction X, as a function of a movement of a member of the occupant of the seat, in particular their finger, along the control direction C.

For example, if the movement of the finger in contact with the first zone $34_1$ of the first control surface 34 is oriented from front to back, the seat is moved away from the instrument panel of the vehicle.

The control device can in particular be implemented for controlling:

a longitudinal movement, in particular a longitudinal translation, of the seat 10 in the vehicle; and/or a longitudinal movement, in particular a longitudinal translation of the seat cushion 12 of the seat 10 in the vehicle and/or a rotation of the seat cushion 12 of the seat 10 relative to a chassis of the vehicle around a first transverse axis; and/or a longitudinal movement, in particular a longitudinal translation and/or a rotation around the transverse axis A1 of the armrest 16 of the seat 10 relative to the seat cushion 12 or to the seatback 14 of the seat; and/or a longitudinal movement, in particular a longitudinal translation, of a part of the armrest 16 relative to another part of the armrest 16, for example when the armrest 16 comprises a telescoping part; and/or a longitudinal movement, in particular a longitudinal translation, of at least one elbow support device S20 of the seat 10; and/or a longitudinal movement, in particular a longitudinal translation, of at least one hand support device S20 of the seat 10; and/or a longitudinal movement, in particular a longitudinal translation, of a headrest of the seat; and/or a longitudinal movement of the seatback of the seat relative to the seat cushion, in particular a rotation of the seatback 14 of the seat 10 relative to the seat cushion 12 of the seat 10, around a second transverse axis of rotation.

The control device 33 may also serve to command the pivoting of the seat 10 around a vertical direction Z, in that way allowing adjustment of an orientation of the seat 10 in the passenger compartment. Preferably, for commanding such a pivoting, the occupant moves a member, notably their finger, in contact with the first zone $34_1$ of the first control surface 34 along the transverse direction Y.

In order to be able to change the function controlled by the first control surface 34, a switching area $34_3$ is provided here. Thus the occupant may switch their command between various comfort functions, between various safety functions, and/or between comfort and safety functions. The switching area $34_3$ also makes it possible to navigate between various configurations of the control device 33.

As can be seen in FIG. 5, the switching area $34_3$ can be provided on the first control surface 34. Alternatively, a switching area, distinct from the first control surface 34 may be provided, preferably on the armrest 16, also preferably on the hand support device S18.

Figure 6:
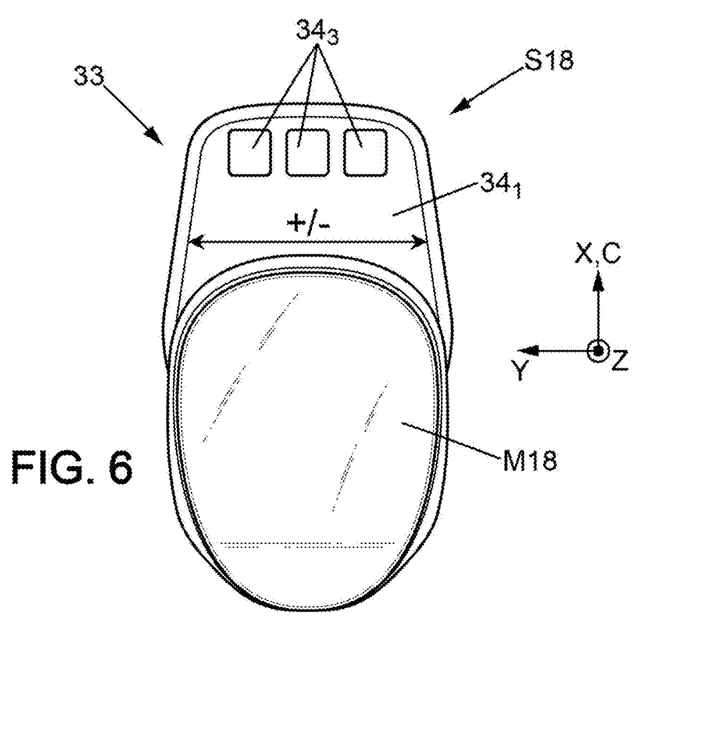
FIG. 6 shows a top schematic view of the hand support device from FIG. 5 according to a second configuration.

As shown in FIG. 6, the switching area $34_3$ may comprise a plurality of physical or virtual buttons accessible to the occupant of the seat 10. According to a variant, the switching zone may comprise at least one physical button sliding along a sliding direction included in the plane P30. In this configuration, the occupant exerts a force tangential to the first control surface 34 in the direction in which the button slides. Alternatively, the switching area may comprise a virtual sliding button, wherein the virtual sliding button is movable by contact and/or movement of the finger of the occupant on the button. The switching area $34_3$ may also comprise a button pivoting around a substantially vertical axis.

FIG. 6 also shows a first tactile area 34₁, configured for receiving the signal produced by the movement of the finger of the occupant along the transverse direction Y. The switching area 34₃ comprises three buttons for switching the function of the seat 10 and/or the vehicle controlled by the control surface 34. For example, the three buttons can allow the choice of a function of an audio device of the automotive vehicle (volume, source, track/frequency).

In this case, a movement of the finger to the left on the first zone 34₁ can control an increase of the volume, the frequency of the radio source or the track number read, and a movement to the right can control a corresponding decrease.

Figure 7:
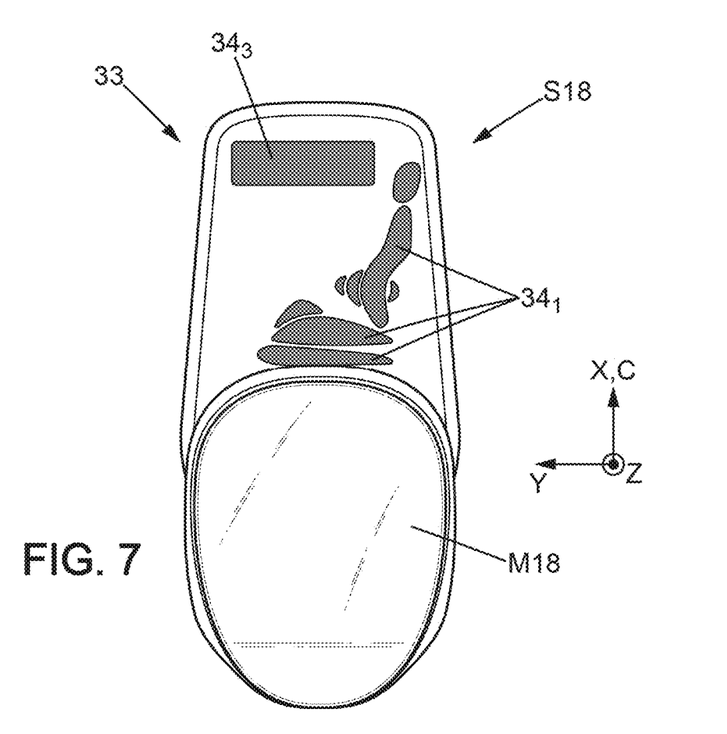
FIG. 7 shows a top schematic view of the hand support device from FIG. 5 according to a third configuration.

FIG. 7 shows a second alternative configuration of the control device 33.

In this configuration, the first control surface comprises a first zone 34₁ and a switching area 34₃. The first zone 34₁ comprises a plurality of buttons, wherein each button represents a part of the seat 10. The buttons are preferably virtual buttons displayed on the touchscreen. The first zone 34₁ can serve for easily selecting a part of the seat of the vehicle, with which a comfort and/or safety function may be associated. In that way, heating of a part of the seat or starting a means of ventilation or massage may in particular be controlled.

Figure 8:
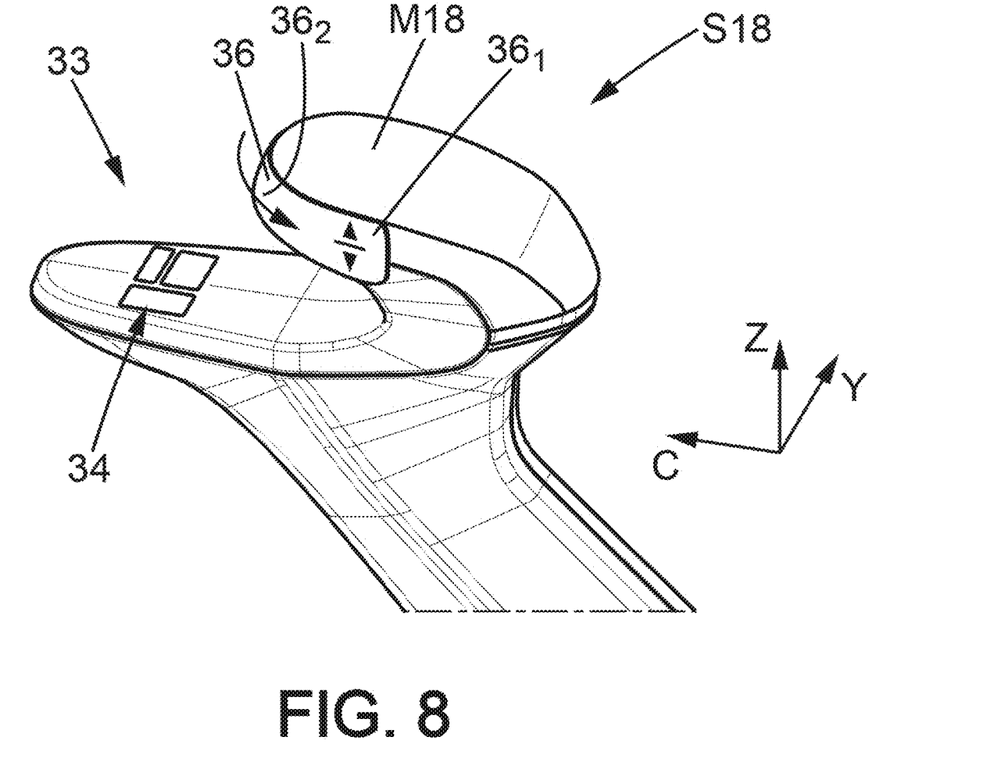
FIG. 8 shows a side schematic view of a second example of the hand support device that may be implemented in the armrest from FIG. 2.

FIG. 8 shows a side schematic view of the hand support device S18 of the armrest 16 according to a variant.

In this variant the hand support device S18 further comprises a second control surface 36. The second control surface 36 is arranged around the anterior edge of the support surface M18. Here, the second control surface 36 is a curved surface, following the curvature of the anterior edge of the support surface M18. Thus, this second control surface 36 is easily accessible to a user.

The second control surface 36 may comprise one or more tactile areas and/or one or more buttons.

The second control surface 36 here comprises a first zone 36₁, in particular accessible by the thumb of the occupant of the seat. In particular, the first zone 36₁ is placed on a left lateral portion of the anterior edge of the support surface M18 when the armrest 16 is installed on the right side of the seat 10. Alternatively, the first zone 36₁ may be placed on a right lateral portion of the anterior edge of the support surface M18 when the armrest 16 is installed on the left side of the seat 10. Thus, the first zone 36₁ is placed on an inner side of the hand support device S18, oriented towards the vehicle seat.

The first zone 36₁ may be configured for controlling a movement of the seat 10 and/or a part of the seat 10, in particular along the vertical direction, as a function of a movement along the vertical direction of the finger of the occupant in contact with the first zone 36₁ of the second control surface 36.

The first zone 36₁ of the second control surface 36 can thus in particular be used for controlling:

a vertical movement, in particular a vertical translation, of the seat 10 in the vehicle; and/or a vertical movement, in particular a vertical translation, of the seat cushion 12 of the vehicle seat 10; and/or a vertical movement, in particular a vertical translation, of the seatback 14 of the vehicle seat 10; and/or a vertical movement, in particular a vertical translation, of the armrest 16 of the seat 10 in the vehicle; and/or a vertical movement, in particular a vertical translation, of the hand support device S18 of the seat 10 in the vehicle; and/or a vertical movement, in particular a vertical translation, of the elbow support device S20 of the seat 10.

The second control surface 36, here also comprises a second zone 36₂, accessible in particular by the fingers of the occupant of the seat, which can be configured for controlling a movement of the seat 10 and/or a part of the seat 10, in particular along the transverse direction or around a vertical direction, as a function of a movement along the transverse direction of a finger of the occupant in contact with the second zone 36₂ of the second control surface 36.

According to a variant, the second control surface 36 has the shape of a knurled knob projecting radially from the anterior edge of the support surface M18, wherein the knurled knob may pivot around a vertical axis.

Thus, the control of the movement of the seat 10 and/or a portion of the seat 10 is done based on an analogous movement of the finger of the occupant of the seat 10 in contact with at least one of the control surfaces 34, 36. The command for the movement is therefore intuitive for the occupant, since they do not need to look directly at the control surfaces 34, 36 for commanding the intended movement of the seat 10 and/or of the part of the seat.

In order to further improve the ergonomics, the first control surface 34 and the second control surface 36 can be remote, in particular separated by a distance included between 10 mm and 80 mm along a substantially vertical direction. In that way, one finger of the occupant can be in contact with the first control surface 34 and another finger of the occupant can be in contact with the second control surface 36. Alternatively, the first and second control surfaces 34, 36 are accessible by a single finger of the occupant of the seat. This configuration is particularly advantageous when the first and second control surfaces 34, 36 comprise tactile areas.

Additionally, the control device 33 can serve to control the plurality of comfort and/or safety functions of the seat with a single hand. Beyond the functions already mentioned above and/or all the position adjustments of an automotive vehicle seat and associated elements, like for example the adjustment of the longitudinal or vertical position of a headrest or a strap return of a seatbelt system, the following can in particular be mentioned here:

an adjustment of an audio device, a car radio and/or a high-fidelity device ("hi-fi") of the vehicle, in particular adjustment of the sound volume or channel played; and/or an adjustment of a command of a GPS device installed in the vehicle; and/or an adjustment of a command of an onboard phone in the vehicle or a phone paired with an onboard computer of the vehicle; and/or an adjustment of a command for a ventilation, air conditioning and/or heating device for a passenger compartment of the vehicle.

Even more, since the armrest 16 is connected to the seat cushion 12 of the seat, the movement of the seat 10 or the seat cushion 12 of the seat 10 causes the secured motion of the armrest 16. In that way, the control device 33 installed in the hand support device S18 is always accessible to the occupant of the seat 10 whatever the position of the seat 10 inside the vehicle. Consequently, control of the comfort and/or safety functions the seat 10 and/or of the vehicle is always within reach of the hand of the occupant of the seat 10, independent of the position of the seat 10.

The control device 33 may again make it possible to adjust the means of action of the seat 10 as a function of the movement of the finger in contact with the first control surface 34. The means of action can for example be means of ventilation, heating, cooling and/or massage included in the seat 10. For example, an intensity level of the means of action can be increased when the finger in contact with the portion of the first zone of the control surface 34 is moved from the front towards the rear along the longitudinal direction L1.

The safety functions may further comprise a command for adopting a position suited for taking back the steering wheel by a driver. In particular, the hand support device S18 can be configured for controlling adopting the position of the seat 10 suited for taking back the steering wheel at the request of the driver.

Next, since the occupant of the seat has easy access to the control device 33, it may be interesting for the control device 33 to have a control with which to adopt a position of the seat 10 suited for taking back the steering wheel, on autonomous vehicles. To do that, the hand support device S18 can for example be provided with a plurality of sensors on the lateral sides of the support surface M18. In this case, the position of the seat suited for taking back the steering wheel is adapted when the driver presses the plurality of sensors at the same time with their hand.

Alternatively, the control device 33 may comprise a second depressible or clickable button, on the hand support device S18, intended to command the position of the seat suited to taking back the steering wheel. The second depressible button is for example placed near the lower surface 30 of the hand support device S18 or near an outer side of the hand support device S18.

The present disclosure is not limited to the examples described above with reference to the figures. The present disclosure encompasses in contrast all the variants and combinations which could be considered by the professional connected with the protection sought.

For example, when the first control surface 34 has a touchscreen, the first control surface 34 is configured such that the occupant of the seat 10 may personalize the functions of the seat 10 and/or of the vehicle which can be adjusted from the control device.

Also, the switching zone of the control device 33 can be separated from the first control surface 34 and/or from the second control surface 36.

In the automotive domain, in particular, a comparative vehicle seat may be configured in order to be displaced inside the vehicle so as to be able to adapt the position thereof to the preferences of an occupant of the seat.

When the comparative seat is an electric seat, the displacement of the seat is done using actuators. The driving of the actuators is then done based on a command from the user. The command from the user is given via comparative control buttons gathered on the control surface.

The comparative control buttons may be installed on a side of the seat of the vehicle, on the instrument panel of the vehicle or on a door the vehicle, in particular on the door closest to the seat to be adjusted.

In this case, however, the comparative control buttons and the associated control surface extend in a substantially vertical plane. In this configuration, the control buttons should be actuated in a direction different from the intended direction of movement of the seat. The use of control buttons in such a configuration is therefore unintuitive for a user.

The present disclosure aims to improve the situation.

For this goal, an automotive vehicle seat control device is described intended to control a displacement along the longitudinal direction, of at least one part of the automotive vehicle seat, wherein the control device comprises at least one first control surface, substantially flat, wherein the first control surface extends along a transverse direction of the seat and a command direction, wherein the command direction has at least one component along the longitudinal direction, and wherein the first control surface is configured for controlling the displacement of the part of the vehicle seat along the longitudinal direction as a function of a movement along the command direction of a member of an occupant of the seat in contact with a first zone of the first control surface.

Thus, advantageously, the displacement of the at least one part of the seat along the longitudinal direction is controlled by a movement of a member of the occupant along a control direction, wherein the control direction has a component along said longitudinal direction. This configuration is therefore intuitive for the user.

In some illustrative embodiments, the control device comprises one or more of the following characteristics, taken alone or in combination:

the control direction consists of a component along the longitudinal direction and, optionally, a component along the vertical direction, wherein the control direction is preferably intended to extend in a substantially horizontal plane, when the control device is fixed to the seat;

the displacement along the longitudinal direction of the part of the seat comprises:

a longitudinal movement, in particular a longitudinal translation and/or a circular translation, of the seat in the vehicle; and/or a longitudinal movement, in particular a longitudinal translation and/or a circular translation, of a seat cushion of the seat relative to a vehicle chassis; and/or a longitudinal movement, in particular a longitudinal translation and/or a circular translation and/or a rotation around a first transverse axis, of at least one armrest of the seat relative to the seat cushion or to a seat back of the seat; and/or a longitudinal movement, in particular a longitudinal translation and/or a circular translation, of a first part of the armrest relative to a second part of the armrest; and/or a longitudinal movement, in particular a longitudinal translation and/or a circular translation and/or a rotation around a second transverse axis, of at least one elbow support device of the seat; and/or a longitudinal movement, in particular a longitudinal translation and/or a circular translation and/or a rotation around a third transverse axis, of at least one hand support device of the seat; and/or a longitudinal movement, in particular a longitudinal translation and/or a circular translation and/or a rotation around a fourth transverse axis of a headrest of the seat; and/or a longitudinal movement of the seatback of the seat relative to the seat cushion, in particular, a rotation of the seatback of the seat relative to the seat cushion of the seat, around a fifth transverse axis of rotation;

the control device further comprises a switching area configured for switching a function controlled by the first control surface, in particular by the first zone of the first control surface, between a plurality of functions of the seat and/or of the vehicle, wherein the switching zone is preferably included in the first control surface;

the first control surface is further configured for controlling a comfort function of the vehicle seat, in particular an adjustment of at least one among a ventilation means, a heating means, a cooling means and a massage means, and/or for controlling a comfort function of the vehicle, in particular an adjustment of at least one among an audio device, a geolocation device and a ventilation, air conditioning and/or heating device for a passenger compartment of the vehicle;

the first control surface comprises a display area, in particular a touchscreen;

the first zone of the first control surface comprises a tactile area;

the first zone of the first control surface comprises a joystick and/or at least one button movable along the control direction, wherein the at least one button is preferably chosen from:

a button sliding along the control direction (C); and/or a virtual button displayed by the touchscreen of the display area and movable by contact and/or movement of the member of the occupant of the seat with the tactile area;

the control device comprises a second control surface, wherein the second control surface is preferably curved, and wherein the second control surface is configured for controlling a movement along a substantially vertical direction or around a substantially vertical direction, respectively, of at least one part of the vehicle seat, preferably depending on a movement respectively along or around the substantially vertical direction of at least one member of the occupant of the seat in contact with the second control surface;

the second control surface comprises a tactile area and/or a button mobile along the substantially vertical direction;

the first control surface and the second control surface are distant, wherein preferably the first control surface and the second control surface are separated by a distance included between 10 mm and 80 mm along the substantially vertical direction;

the first control surface comprises a means of human-machine interaction configured for commanding adopting a position suited for taking back a steering wheel of the vehicle by a driver;

the control device comprises an electronic control unit configured for translating a signal captured by the first control surface into an instruction for at least one actuator configured for controlling the movement of the at least one part of the seat.

According to another aspect, a hand support device for automotive vehicle seat is described comprising a support surface suited for receiving a palm of a hand of an occupant of the seat, and at least one control device such as described above in all combinations thereof, wherein the control device is configured for being accessible by at least one finger of the occupant of the seat when the palm of the occupant of the seat is in contact with the support surface.

According to some embodiments, the hand support device comprises one or more of the following characteristics, taken alone or in combination:

the second control surface of the control device comprises a first zone accessible to a thumb of the occupant of the seat when a hand of the occupant is placed on the support surface of the hand support of the armrest;

the tactile area and/or the movable button of the control device are laid out around an anterior edge of the support surface.

According to another aspect, an armrest for automotive vehicle seat is described comprising a command device such as described above in all combinations thereof.

According to another aspect, an armrest for automotive vehicle seat is described comprising an elbow support device and a hand support device such as described above in all combinations thereof.

According to another aspect, an automotive vehicle seat is described comprising a seat back, a seat cushion and an armrest such as described above in all combinations thereof, fixed to the seat cushion and/or the seatback, wherein the armrest is preferably mounted on the seatback or on the cushion of the seat, pivoting around a transverse axis so as to modify an orientation of the first control surface, and wherein the first control surface extends preferably along a fixed transverse direction and along a control direction variable by rotation around the transverse axis.

According to another aspect, a hand support device for automotive vehicle seat is described comprising a support surface suited for receiving a palm of a hand of an occupant of the seat, and a control device with a first control surface of which a first zone is configured for controlling at least one comfort and/or safety function of the seat, wherein the control device is configured such that the first zone is accessible by a finger of the occupant of the seat when the palm of the occupant of the seat is in contact with the support surface.

Thus, advantageously, the control surface is accessible by the occupant of the seat, whatever the configuration of the seat.

The hand support device comprises one or more of the following characteristics, taken alone or in combination:

the at least one first control surface extends along a plane;

the plane is intended to be substantially horizontal when the hand support device is fixed to the seat of the vehicle;

the plane extends along a transverse, horizontal direction and along a control direction, having a longitudinal component;

the at least one comfort and/or safety function comprises a movement of the seat or a part of the seat along a longitudinal direction, wherein the first control surface is configured for controlling the movement of the seat or the part of the seat along the longitudinal direction, depending on a movement along the control direction of a finger of an occupant of the seat, in contact with the first control surface;

the movement of a part of the seat along the longitudinal direction comprises:

a longitudinal movement, in particular a longitudinal translation and/or a circular translation, of the seat in the vehicle;

a longitudinal movement, in particular a longitudinal translation and/or a circular translation, of a seat cushion of the seat relative to a vehicle chassis;

a longitudinal movement, in particular a longitudinal translation and/or a circular translation and/or a rotation around a first transverse axis, of at least one armrest of the seat relative to the seat cushion or to a seat back of the seat;

a longitudinal movement, in particular a longitudinal translation and/or a circular translation, of a first part of the armrest relative to a second part of the armrest;

a longitudinal movement, in particular a longitudinal translation and/or a circular translation and/or a rotation around a second transverse axis, of at least one elbow support device of the seat;

a longitudinal movement, in particular a longitudinal translation and/or a circular translation and/or a rotation around a third transverse axis, of at least one hand support device of the seat;

a longitudinal movement, in particular a longitudinal translation and/or a circular translation and/or a rotation around a fourth transverse axis of a headrest of the seat; and/or a longitudinal movement of the seatback of the seat relative to the seat cushion, in particular, a rotation of the seatback of the seat relative to the seat cushion of the seat, around the fifth transverse axis of rotation;

the at least one comfort and/or safety function further comprises a movement of the seat along a first transverse direction and/or a pivoting of the seat around a vertical axis of rotation, wherein the first control surface is preferably configured for controlling the movement of the seat along the first transverse direction and/or pivoting the seat around the vertical axis of rotation, depending on of movement along a second transverse direction of a finger of an occupant of the seat, in contact with the first zone of the first control surface;

the at least one comfort and/or safety functions comprise at least one from:
an adjustment of a ventilation device for the seat;
an adjustment of a heating device for the seat;
an adjustment of a cooling device for the seat;
an adjustment of a massaging device for the seat;
an adjustment of the sound volume of a car radio device, an audio device and/or a high-fidelity device for the vehicle;
an adjustment of a channel broadcast by the car radio device, the audio device and/or the high-fidelity device for the vehicle;
an adjustment of a command of a geo-localization device installed in the vehicle;
an adjustment of a command of an onboard phone in the vehicle or a phone paired with an onboard computer of the vehicle;
an adjustment of a command for a ventilation, air conditioning and/or heating equipment for a passenger compartment of the vehicle;
an adjustment of the longitudinal position of the headrest of the seat;
a command for adapting a position of the seat suited for taking back the steering wheel by a driver;
the first zone of the at least one first control surface comprises at least one tactile region and/or at least one button and/or at least one joystick;
The at least one button is chosen from:
a clickable or depressible button;
a knurled knob configured for being turned around an axis of rotation included in the plane along which the control zone extends;
a trigger;
a fishhook; and/or
a virtual button of the first control surface configured for capturing the contact and/or movement of one or more fingers of the occupant of the seat;
the hand support device further comprises at least one display area associated with the first zone of the at least one first control surface, wherein the display area is preferably included in the first control surface; and
the hand support device further comprises a second control surface intended to extend along a substantially vertical plane when the hand support device is fixed to the vehicle seat, wherein the second command surface is configured for controlling a movement of the seat and/or a part of the seat along a first vertical direction depending on a movement along a second vertical direction of a finger of an occupant of the seat, in contact with the second control surface.

According to another aspect, a hand support device assembly is described comprising an electronic control unit and a hand support device such as described above in all combinations thereof, in which the electronic control unit is configured for translating a signal received by the first control surface into an instruction for at least one actuator configured for activating the at least one comfort and/or safety function.

According to another aspect, an armrest for automotive vehicle seat comprising an elbow support device and a hand support device such as described above in all combinations thereof, in particular in the hand support device assembly such as described above is described in all combinations thereof.

An automotive vehicle seat comprising a seat back, a seat cushion and a hand support device such as described above, in all combinations thereof, in particular in the armrest such as described above in all combinations thereof is further described in which the hand support is fixed to the seat cushion and/or the seatback.

The invention claimed is:

1. A control device for automotive vehicle seat intended to control a displacement along the longitudinal direction, of at least one part of the automotive vehicle seat, the control device comprising
at least one first control surface, substantially flat, wherein the first control surface extends along a transverse direction of the seat and a command direction, wherein the command direction has at least one component along the longitudinal direction, and wherein the first control surface is configured for controlling the displacement of the part of the vehicle seat along the longitudinal direction as a function of a movement along the command direction of a member of an occupant of the seat in contact with a first zone of the first control surface,
wherein the first control surface comprises at least one of a display area and a touchscreen.

2. The control device of claim 1, wherein the control direction is intended to extend in a substantially horizontal plane, when the control device is fixed to the seat.

3. The control device of claim 1, wherein the displacement along the longitudinal direction of the part of the seat comprises at least one of:
a longitudinal movement of the seat in the vehicle; and
a longitudinal movement of a seat cushion of the seat relative to a vehicle chassis; and
a longitudinal movement of at least one armrest of the seat relative to the seat cushion or to a seat back of the seat; and
a longitudinal movement of a first part of the armrest relative to a second part of the armrest; and
a longitudinal movement of at least one elbow support device of the seat; and
a longitudinal movement of at least one hand support device of the seat; and
a longitudinal movement of a headrest of the seat; and
a longitudinal movement of the seatback of the seat relative to the seat cushion.

4. The control device of claim 1, further comprising a switching area configured for switching a function controlled by the first control surface, between a plurality of functions of at least one of the seat and the vehicle.

5. The control device of claim 1, wherein the first control surface is further configured for controlling at least one of:
a comfort function of the vehicle seat; and
a comfort function of the vehicle.

6. The control device of claim 1, wherein the first zone of the first control surface comprises the touchscreen.

7. The control device of claim 1, wherein the first zone of the first control surface comprises at least one of a joystick and at least one button movable along the control direction.

8. The control device of claim 1, comprising a second control surface.

9. The control device of claim 8, wherein the second control surface comprises at least one of a tactile area and a button mobile along a substantially vertical direction.

10. The control device of claim 8, wherein the first control surface and the second control surface are distant.

11. The control device of claim 1, wherein the first control surface comprises a means of human-machine interaction configured for commanding adopting a position suited for taking back a steering wheel of the vehicle by a driver.

12. The control device of claim 1, comprising an electronic control unit configured for translating a signal captured by the first control surface into an instruction for at least one actuator configured for controlling the movement of the at least one part of the seat.

13. An armrest for automotive vehicle seat, comprising a control device according to claim 1.

14. A hand support device for automotive vehicle seat comprising a support surface suited for receiving a palm of a hand of an occupant of the seat, and at least one control device according to claim 1, wherein the control device is configured for being accessible by at least one finger of the occupant of the seat when the palm of the occupant of the seat is in contact with the support surface.

15. The hand support device of claim 14, wherein the control device comprises a second control surface, wherein the second control surface comprises a first zone accessible to a thumb of the occupant of the seat when a hand of the occupant is placed on the support surface of the hand support of the armrest.

16. The hand support device of claim 15, wherein the second control surface comprises at least one of a tactile area and a button mobile along the substantially vertical direction, wherein at least one of the tactile area and the movable button are laid out around an anterior edge of the support surface.

17. An automotive vehicle seat, comprising a seat back, a seat cushion and an armrest according to claim 13, fixed to at least one of the seat cushion and the seatback.

18. An armrest for automotive vehicle seat, comprising an elbow support device and a hand support device according to claim 14.

19. An armrest for automotive vehicle seat, comprising an elbow support device and a hand support device according to claim 16.

* * * * *